(12) United States Patent
Parks

(10) Patent No.: US 7,857,274 B1
(45) Date of Patent: Dec. 28, 2010

(54) PIVOTAL SUPPORT FOR ANIMAL FEEDING BOWL

(75) Inventor: Linda Parks, Napa, CA (US)

(73) Assignee: Lixit Corporation, Napa, CA (US)

( * ) Notice: Subject to any disclaimer, the term of this patent is extended or adjusted under 35 U.S.C. 154(b) by 100 days.

(21) Appl. No.: 12/074,107

(22) Filed: Feb. 28, 2008

(51) Int. Cl.
*A47F 5/00* (2006.01)

(52) U.S. Cl. .................. 248/310; 248/230.1; 248/240

(58) Field of Classification Search .............. 248/310, 248/240, 218.4, 219.4, 230.1, 230.6, 240.3; 108/47, 152; 119/68, 69, 61.5, 61.54, 61.56, 119/61.57; 182/187
See application file for complete search history.

(56) References Cited

U.S. PATENT DOCUMENTS

| | | | | |
|---|---|---|---|---|
| 363,780 A | * | 5/1887 | Wright et al. ............... 248/97 |
| 434,514 A | * | 8/1890 | Lamb ........................ 248/97 |
| 3,941,250 A | * | 3/1976 | Ott ........................... 211/1.3 |
| 4,099,470 A | * | 7/1978 | Cannon, Jr. ................. 108/26 |
| 5,501,176 A | * | 3/1996 | Tully ....................... 119/61.57 |
| 5,562,180 A | * | 10/1996 | Herzog et al. ............... 182/187 |
| 5,855,184 A | | 1/1999 | Eichler et al. |

* cited by examiner

*Primary Examiner*—Korie Chan
(74) *Attorney, Agent, or Firm*—Howard Cohen

(57) ABSTRACT

A bracket for releaseably supporting a pet feeding or watering bowl in a cage. The bracket is composed of two portions which are hingedly connected whereby the bracket portion to which the bowl is releasably connected, when in an horizontal position, may be pivoted to a vertical position with the bowl removed so as to permit folding or collapsing of the cage for storage or shipping.

6 Claims, 2 Drawing Sheets

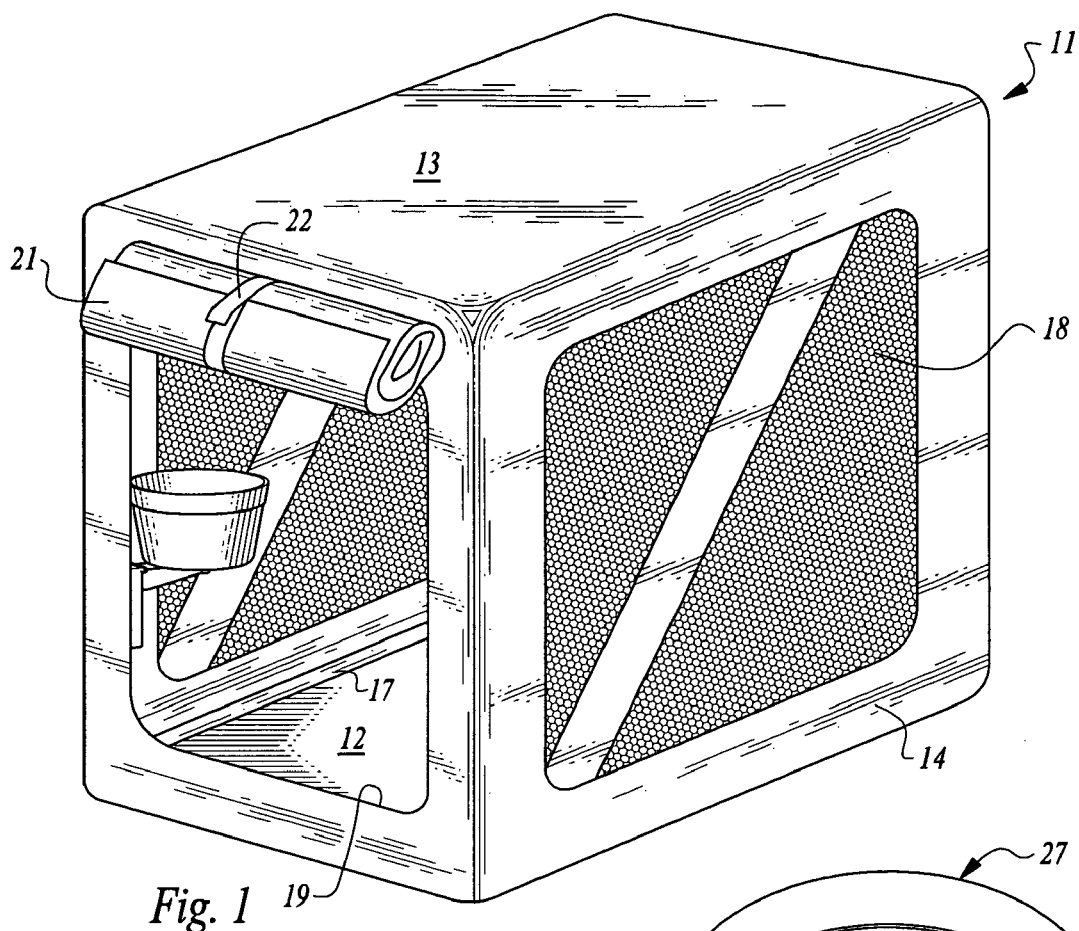
Fig. 1
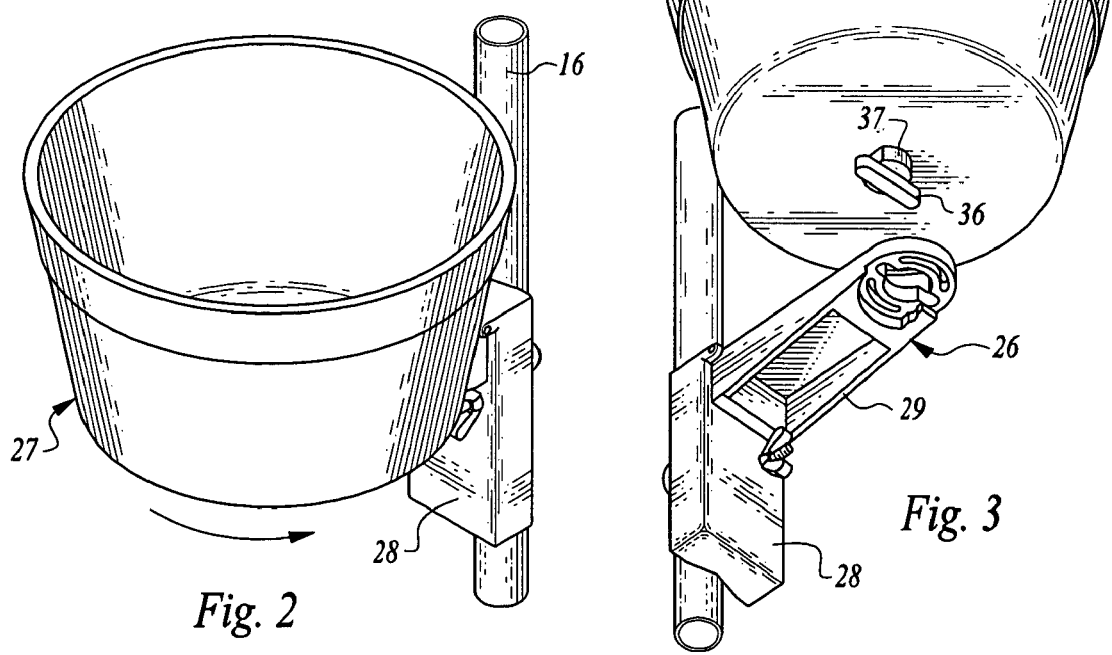
Fig. 2
Fig. 3

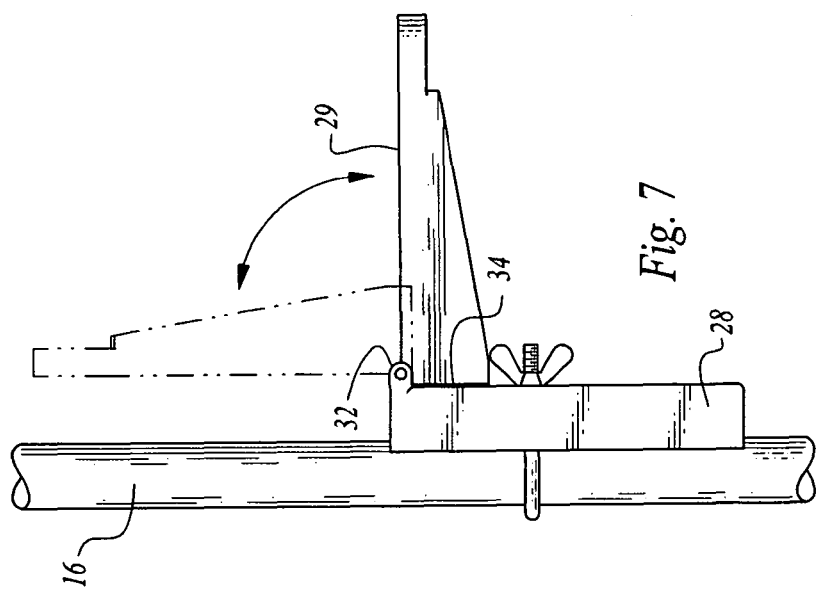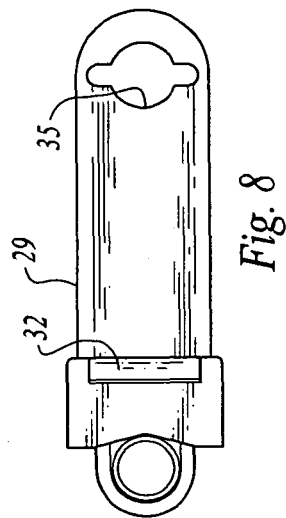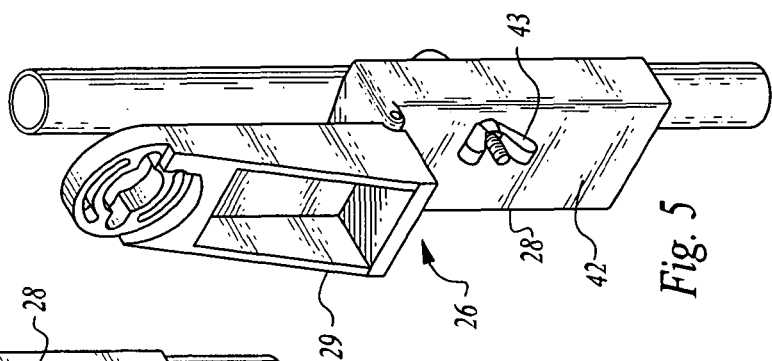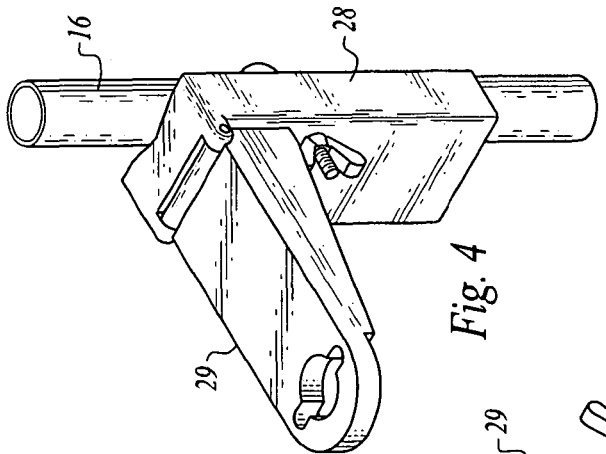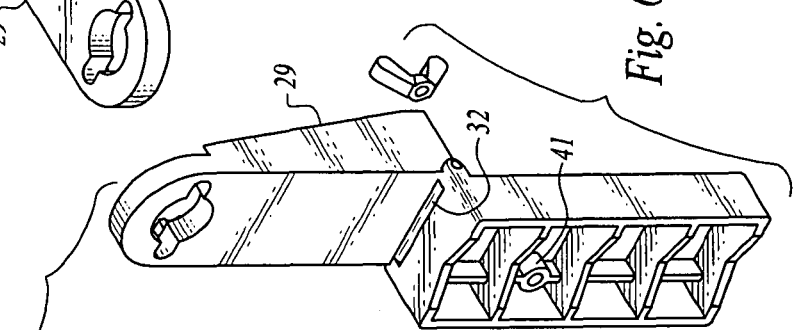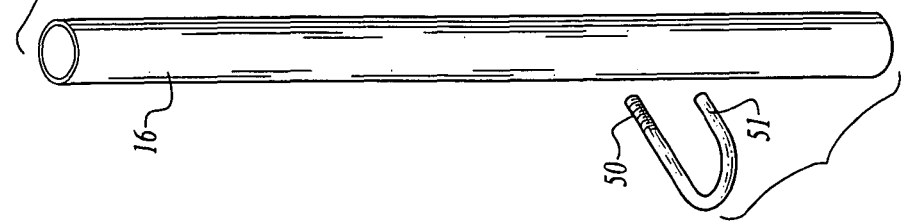

PIVOTAL SUPPORT FOR ANIMAL FEEDING BOWL

CROSS-REFERENCE TO RELATED APPLICATIONS

Not applicable.

FEDERALLY FUNDED RESEARCH

Not applicable.

SEQUENCE LISTING, ETC. ON CD

Not applicable.

BACKGROUND OF THE INVENTION

1. Field of the Invention

This invention generally relates to feeding or watering devices for dogs, cats, and other small animals. More particularly, this invention relates to a means for removably supporting a bowl on a support member of a cage or the like, in which such animal may be placed. More specifically, the present invention is particularly well adapted to be utilized in a folding or collapsible type of cage wherein the bowl can be easily removed to permit a relatively thin profile for the cage in its collapsed position. Further, the bowl support means is moveable between an expanded operated position and a folded storage position in the cage so as to minimize the profile of such means when in its folded position.

2. Description of Related Art

A related invention is disclosed in U.S. Pat. No. 5,855,184 of Jan. 5, 1999 and is commonly owned by the assignee of the present invention. Said patent discloses a feeding or watering bowl of generally conventional construction, except for the bottom of the bowl. The lower surface of such bottom is provided with a depending cylindrical lug extending axially downwardly from the center of the bottom wall, with the lug having a locking bar positioned in space relation to the bottom wall. The ends of such bar extend outwardly from the cylinder lug along a diameter of the bowl.

The above patent further discloses a bracket having a proximal end, having a clamping assembly adapted to be secured to a vertical or horizontal wire or mesh which defines the cage. The bracket has an upper flat web portion, extending outwardly from the clamping assembly on which the flat bottom wall of the bowl may be seated. The distal end portion of the web is cut to provide an opening shaped to receive the lug and locking bar of the bowl. The locking bar and lug may be inserted into the opening so that the ends of the bar impinge on the underside of the web of the bracket. The bottom surface of the bowl engages the top surface of the web, preventing any substantial movement of the bowl or container relative to the bracket.

To install the bowl on the bracket, it is only necessary to align the bowl bar with the opening in the web, and then rotate the bowl relative to the bracket. A reverse rotation will cause the locking lug to be aligned with the web opening and permit the bowl to be lifted and removed from the bracket.

This patent has acquired a substantial success in the marketplace, but is not particularly adapted to meet the requirements and the problems presented in the use of a foldable cage or container for an animal.

BRIEF SUMMARY OF THE INVENTION

Subsequent to the filing and issuance of U.S. Pat. No. 5,855,184, collapsible or folding cages or carriers for pets have come into widespread use. Such cages are popular because they can be readily converted into a box-like enclosure for receiving and containing the pet, and then collapsed or folded into a generally flat, empty condition for storage or transport.

Using the cantilever bracket 12 of U.S. Pat. No. 5,855,184 to support the bowl 11, the latter may be easily removed from the bracket, but the bracket usually remains in a fixed position extending generally horizontally with its proximal end basically locked to a vertical wall support member of the cage.

In order to avoid repeating all of the details of the bowl 11 and locking assembly 14 through which the bowl is supported and releasably locked to bracket 12, such details are hereby incorporated from said patent to the present application by reference.

In accordance with the teachings of the present invention, the bracket 12 is shown in U.S. Pat. No. 5,855,184 has been modified so that it may assume two separate and distinct positions relative to a vertical support member on the cage. The first of such positions is generally horizontal for supporting the bottom of the bowl when the cage is in its operative condition for receiving an animal and a bowl in which water or food for the pet may be placed. The second of said positions puts the bracket in a vertical inoperative position adjacent a vertical support member to which it is attached. In this latter position, the bracket will not add any substantial depth or thickness to the collapsed or foldable cage, but is readily available for use when the cage is open by merely pivoting the bracket from its vertical inoperative position to its horizontal bowl supporting operative position. No tools or other equipment are necessary to perform this function, and with the bracket in the horizontal position, the bowl may be simply placed over the same as above described, rotated, and locked in place.

BRIEF DESCRIPTION OF THE DRAWINGS

FIG. 1 is a front perspective view of a foldable or knockdown cage in an operative position for receiving a pet, with a food or beverage bowl supported within the confines of the cage.

FIG. 2 is a perspective view on an enlarged scale of the bowl in its operative condition seated on the bracket support.

FIG. 3 is another perspective view of the bowl removed from the bracket support and ready to be installed on the bracket.

FIG. 4 is a perspective view of the bracket support in its open operative condition.

FIG. 5 is a perspective view of the bracket support mounted on a vertical cage support member and shown in its vertical inoperative position.

FIG. 6 is an exploded perspective view of the means for attaching the bracket to the vertical support mesh or support of the cage.

FIG. 7 is a side elevational view of the bracket attached to the vertical support member with the dash-dot lines illustrating the bracket it its vertical inoperative position.

FIG. 8 is a top plan view of the mechanism shown in FIG. 7.

DETAILED DESCRIPTION OF THE INVENTION

The device of the present invention will be shown and described in combination with a foldable or collapsible type of cage of the type previously mentioned. It should be understood, however, that the features of this invention are not limited to the particular cage or animal container shown in these drawings or described herein.

FIG. 1 discloses one form of foldable cage 11, which includes a bottom wall 12, a top wall 13, and side walls 14. The walls may be formed of a flexible material such as canvas, with vertically rigid rods or suitable support or stiffening members 16 extending vertically at each corner of the cage. Similar like horizontal rigid support members 17 along the top and bottom walls and their junctures with the side walls 14 are provided to give rigidity to the cage when in its open operative condition. One or more of the side walls may be provided with a screen or mesh 18 to permit light and air to enter the cage. The front wall, as seen in FIG. 1, has an opening 19 through which the animal may enter and leave the cage. To contain the pet in the cage, a rollable curtain or flap 21 may be attached at the top of the front opening. The curtain is shown in its rolled up configuration permitting access to the interior of the cage. In such position, the curtain can be held in an open position by means of a strap 22 or the like. When unrolled, the curtain will generally cover the opening 19 and may be secured to the front wall around the opening by any suitable fasteners, such as snaps, velcro attachments, or the like. Such arrangements do not comprise any part of the present invention, and accordingly, are not shown in any detail in the drawings. The manner of collapsing the cage into a relatively flat package is likewise not illustrated in this application since such collapsing mechanisms are well known in the pet industry.

Attached to one of the front vertical supports or rods 16, which could constitute a vertical wire mesh element, and preferably one adjacent the entry opening, is a support means 26 for supporting a bowl 27, which may be operatively mounted thereon. Support means 26 effectively comprises a rod engaging portion 28 and a bowl supporting portion 29. One end of portion 28 is attached to an end of portion 29 by a pivot pin 32, or any other suitable hinge arrangement permitting portion 28 to remain in its normal vertical orientation when attached to its supporting rod while simultaneously permitting portion 29 to move between a horizontal orientation for supporting the bowl 27 (FIG. 4), and a vertical inoperative vertical position (FIG. 5) permitting appropriate folding or collapsing of the cage into its inoperative flattened condition.

It should be noted that in moving portion 29 from its inoperative position of FIG. 5, to its operative position of FIG. 4, it is merely necessary to rotate portion 29 clockwise (as indicated in FIG. 7) and about the pivot 32 until an end wall 34 of portion 29 engages the exposed rear wall of portion 28, stopping further movement of member 29 beyond its desired horizontal operative position. The flat upper surface of portion 29 is then in position to support bowl 27 and receive the locking bar 36 and cylindrical lug 37 on the bowl bottom entering into the hole and lug receiving openings 35 in the bracket portion 29. For a more detailed explanation of this arrangement and how twisting or rotating the bowl will selectively permit placing or removing the bowl in position and locking it in place, or permitting removal of the bowl for storage such as when the bowl is to be refilled or whether it is to be removed for subsequent transfer of the unit without the bowl occupying a rather large portion of the package size, reference may be made to said U.S. Pat. No. 5,855,184.

With bracket portion 29 in its horizontal operative position, even if bowl 27 is removed, portion 29 will still extend into the cage for approximately three inches, depending on the bowl diameter. Such extension would obviously interfere with the rolling or folding of the cage into a flattened or compact configuration.

Accordingly, as a feature of the present invention, means are provided for moving said bowl supporting portion 29 from its depicted operative position extending into the cage, to a generally vertical position along a vertical support rod for the cage when not being used to support the bowl.

While such movement can be effected in a number of different ways, I have preferred to utilize the two position hinge arrangement above described. As shown, the vertical portion 28 serves several purposes. First, it is the part of the bracket which may be relatively permanently attached to a vertical support rod in the cage at any desired height. Such attachment may be effected by providing a hole 41 extending through the vertical wall 42 of member 28. To secure portion 28 to rod 16, a threaded bolt 50 passes through the hole. One end of the threaded bolt is provided with a generally U-shaped hook 51 for engaging the outer portion of a rod 16. Upon placing a wingnut 43 on the threaded end from the other side of the bracket element, the rod, the bracket, and bolt may be tightly secured against relative movement. After the parts have been secured in this fashion, bracket portion 29 may be pivoted downwardly through approximately 90 degrees of movement at which time, the flat end 34 of bracket portion 29 serves another purpose in engaging the flat opposing surface of bracket element 28 and maintain the bracket sections in this normally related disposition.

While simple in construction and operation, the foregoing arrangement serves a highly useful and practical solution to the compact storage of pet cages. It should be appreciated that the use of this hinged bracket arrangement is not limited to use with pet foldable cages, but can also be used with more rigid type of cages which may be folded for storage or transportation or the like.

The invention claimed is:

1. A device for supporting a pet feeding bowl on a vertical support member, said device including a first bracket portion adapted to engage said vertical support member, means for securing said first bracket portion to said vertical support member at selected positions along the height of the latter, a second bracket portion adapted to underlie and support a central bottom portion of said bowl, said second bracket portion and said central bottom portion of said bowl having cooperative means for selectively and releasably holding said bowl on said second bracket portion and permitting separation thereof upon rotation of the bowl about a vertical axis, means pivotally connecting said bracket portions together whereby said second bracket portion may be disposed generally normal to said first bracket portion when in a bowl supporting operative position and generally parallel to said first bracket portion and said vertical support member when in a stored inoperative position.

2. A device as set forth in claim 1 in which said pivotally connecting means is disposed along an upper edge of said first bracket portion when the latter is secured to said vertical support member, and said bowl holding means being positioned adjacent one end of said second bracket portion.

3. A device as set forth in claim 2 in which said pivotally connecting means is disposed adjacent the other end of said second bracket portion.

4. A device as set forth in claim 1 in which means are provided for limiting pivotal movement of said second bracket portion between a generally vertical position and a horizontal position.

5. A device as set forth in claim 4 in which said stop means includes a surface generally normal to the plane of said second bracket portion which abuts a surface on said first bracket portion to stop further pivotal movement of said second bracket portion and limits such movement to a generally horizontal orientation.

6. A device as set forth in claim 1, wherein said second bracket portion has a maximum width dimension that is substantially less than the width of said central bottom portion of said bowl.

* * * * *